United States Patent
Koerner et al.

(10) Patent No.: US 9,626,453 B2
(45) Date of Patent: Apr. 18, 2017

(54) ANALYTIC SOLUTION WITH A SELF-LEARNING AND CONTEXT-SENSITIVE SEMANTIC LAYER

(71) Applicants: Dennis Koerner, Karlsdorf-Neuthard (DE); Andreas Linke, Rauenberg (DE)

(72) Inventors: Dennis Koerner, Karlsdorf-Neuthard (DE); Andreas Linke, Rauenberg (DE)

(73) Assignee: SAP SE, Walldorf (DE)

( * ) Notice: Subject to any disclaimer, the term of this patent is extended or adjusted under 35 U.S.C. 154(b) by 297 days.

(21) Appl. No.: 14/581,046

(22) Filed: Dec. 23, 2014

(65) Prior Publication Data

US 2016/0179877 A1 Jun. 23, 2016

(51) Int. Cl.
*G06F 7/00* (2006.01)
*G06F 17/30* (2006.01)

(52) U.S. Cl.
CPC .... *G06F 17/3097* (2013.01); *G06F 17/30401* (2013.01)

(58) Field of Classification Search
CPC .............................................. G06F 17/30401
See application file for complete search history.

(56) References Cited

U.S. PATENT DOCUMENTS

2002/0083067 A1* 6/2002 Tamayo ............ G06F 17/30864
2010/0070448 A1* 3/2010 Omoigui ............. H01L 27/1463
706/47

* cited by examiner

*Primary Examiner* — Ajith Jacob
(74) *Attorney, Agent, or Firm* — Brake Hughes Bellermann LLP (57) ABSTRACT

According to a general aspect, a system includes a query engine configured to receive a query from a user via a user interface layer for obtaining data from one or more databases, determine if a keyword of the query can be mapped to at least one of a plurality of keyword mappings stored in a semantic layer, and if the keyword cannot be mapped, provide an interactive object, via the user interface layer, to learn a new keyword mapping for the keyword such that the semantics layer is updated with the new keyword mapping for future queries. The system includes a prediction engine configured to check for previous queries of the user or other users that map the query to predict a next query, and the query engine is configured to provide query results of the query and the next query as a suggestion via the user interface layer.

20 Claims, 4 Drawing Sheets

ANALYTIC SOLUTION WITH A SELF-LEARNING AND CONTEXT-SENSITIVE SEMANTIC LAYER

BACKGROUND

Through globalization, big-data driven business operations may increase over time. However, interaction with big-data remains relatively complicated. Conventionally, analytics tools used to interact with big-data are based on a static model defined by data experts that provides pre-defined reports. Modifications to these reports are relatively expensive and complicated. Instead, data is typically imported into spreadsheet applications that provide their own internal calculation logic with the risk of inconsistent data being calculated differently. Also, during reporting, the imported data is often outdated.

SUMMARY

According to a general aspect, a system for dynamic data modeling that enables a self-learning and context-sensitive semantic layer to query data includes a query engine configured to receive a query from a user via a user interface layer for obtaining data from one or more databases, determine if a keyword of the query can be mapped to at least one of a plurality of keyword mappings stored in a semantic layer, and if the keyword cannot be mapped, provide an interactive object, via the user interface layer, to learn a new keyword mapping for the keyword such that the semantics layer is updated with the new keyword mapping for future queries. The system includes a prediction engine configured to check for previous queries of the user or other users that map the query to predict a next query, and the query engine is configured to provide query results of the query and the next query as a suggestion via the user interface layer.

In some examples, the system may include one or more of the following features (or any combination thereof). The query may include natural language input. The query engine may include a keyword parser configured to parse the query to obtain one or more keywords. The query engine may include a fuzzy logic unit configured to correct a misspelled keyword of the query based on fuzzy logic. The query may include a new keyword not found in the semantic layer, and the query engine includes a query logic unit configured to determine that the new keyword is similar to a known keyword mapping based on thesaurus information. Before the query results are provided, the query engine may request feedback from the user regarding a keyword mapping of the query when a confidence level is below a threshold value. The query engine may provide a suggested known keyword mapping via the interactive object. The query engine may create a new semantic layer assignment based on input received from the interactive object. The query engine may receive a subsequent query from the user, and the query engine may combine the query results of the query with the subsequent query to produce a combined search set to be executed on the databases.

According to a general aspect, a computer program product tangibly embodied on a non-transitory computer-readable storage medium and including executable code that, when executed, is configured to cause at least one processor to receive a query from a user for obtaining data from one or more databases, determine if a keyword of the query can be mapped to at least one of a plurality of keyword mappings stored in a semantic layer, if the keyword cannot be mapped, provide an interactive object, via the user interface layer, to learn a new keyword mapping for the keyword, update the semantics layer with the new keyword mapping for future queries, check for previous queries of the user or other users that map the query to predict a next query, and display query results of the query and the next query to the user via the user interface layer.

The computer program product may include one or more of the following features. The query may include natural language input. The executable code that, when executed, is configured to cause the at least one processor to parse the query to obtain keywords including a new keyword, enhance the keywords based on fuzzy logic, and map the new keyword to an existing keyword mapping based on thesaurus information. The executable code that, when executed, is configured to cause the at least one processor to display the query results when a confidence level is above a threshold value, otherwise request feedback from the user regarding a keyword mapping of the query. The executable code that, when executed, is configured to cause the at least one processor to visualize the query results into at least one of a table and a chart. The interactive object may provide a suggested known keyword mapping. The semantic layer also may include data relationship specifying relationships among data in the databases and data source information specifying locations of data in the databases. The executable code that, when executed, is configured to cause the at least one processor to combine the query results of the query with a subsequent query to create a combined search set.

According to a general aspect, a method for dynamic data modeling that enables a self-learning and context-sensitive semantic layer to query data includes receiving a query from a user for obtaining data from data sources, where the query includes a first keyword and a second keyword, determining that the first keyword is a new keyword but is similar to a known keyword mapping stored in a semantic layer, determining that the second keyword cannot be mapped to any known keyword mappings stored in the semantic layer, providing an interactive object, via a user interface layer, to request a new keyword mapping for the second keyword, updating the semantics layer with the new keyword mapping for future queries, obtaining query results corresponding to the query having the first keyword and the second keyword, and displaying the query results via the user interface layer.

The method may include one or more of the following features (or any combination thereof). The query may include natural language input. The method may include receiving a subsequent query, combining the query results of the query with the subsequent query to obtain a combined search, and executing the combined search on the data sources.

The details of one or more implementations are set forth in the accompanying drawings and the description below. Other features will be apparent from the description and drawings, and from the claims.

DETAILED DESCRIPTION

The embodiments provide systems and methods for implementing an interaction model with the user in order to interact with data of any data source in a natural way. In some examples, the system receives natural language input from the user and processes the input using multiple technologies such as keyword mapping, fuzzy logic, context-sensitivity and historical search data. These and other features of the embodiments are further described with reference to the figures.

Figure 1:
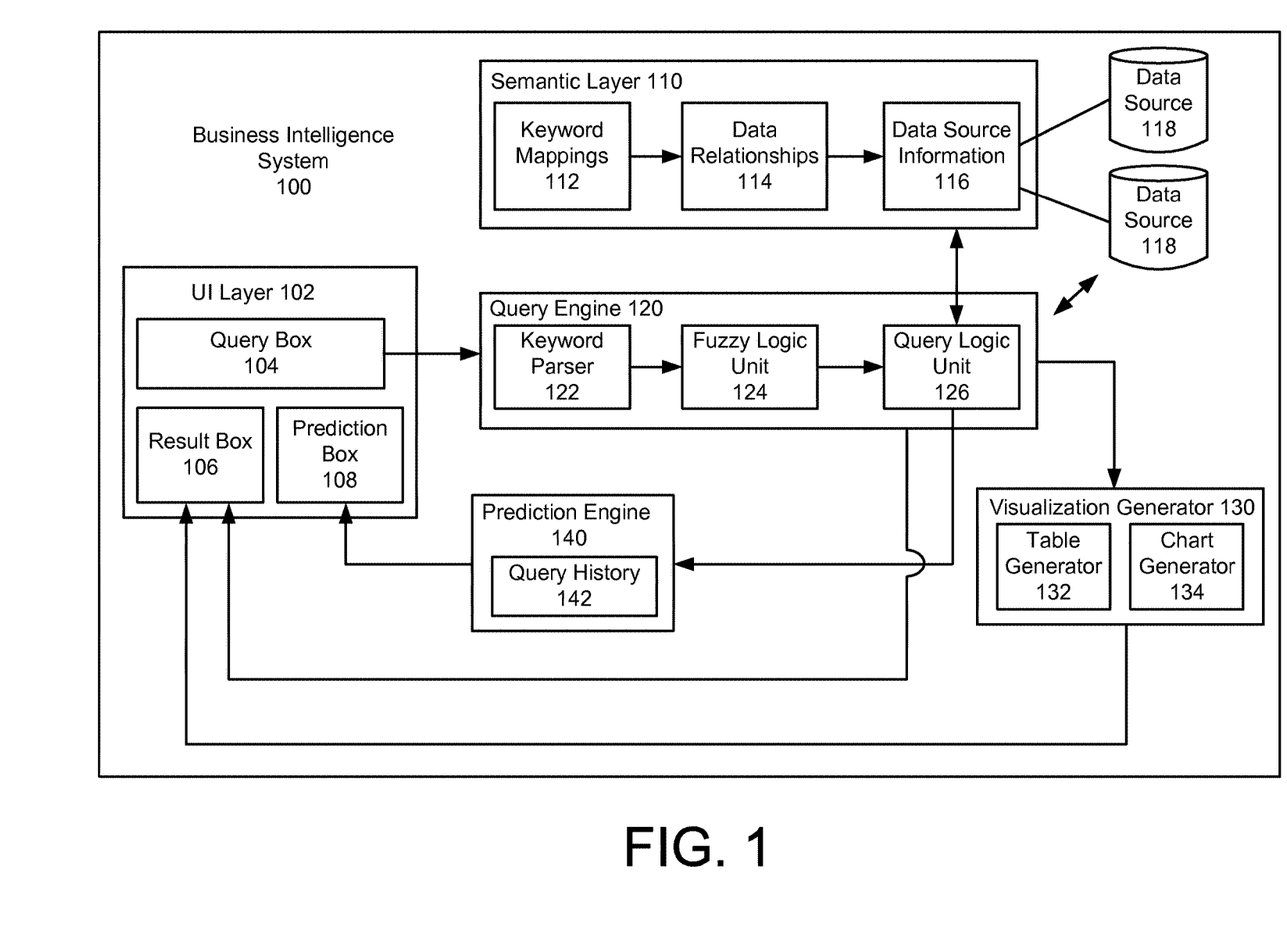
FIG. 1 illustrates a business intelligence system for dynamic data modeling that enables a self-learning and context-sensitive semantic layer to query data.

FIG. 1 illustrates a business intelligence system 100 for data retrieval using an interactive, dynamic model that enables a self-learning and context-sensitive semantic layer 110 to allow an end user to retrieve and report data in a natural way from one or more data sources 118. Instead of pushing the end user into a pre-defined or static model thereby allowing the end user access to only a pre-defined set of data reporting, the business intelligence system 100 allows the end user to explore data in a manner similar to a conversation, e.g., starting on a broad level and then detailing into specific areas that he/she is attempting to locate. For example, similar to a conversation with another person, the end user can build context, starting with a broad question and then drill down into specific areas. As a result, the end user can receive insight into data without relying on data experts to write a data model to retrieve the data. For example, when the end user starts to work with data, he/she may not yet completely know which other data to add to the starting set to get the insight he/she is attempting to obtain. Conventionally, the end user would go back to the data experts so that they can create a model to capture what the end user wants. However, according to the embodiments, the business intelligence system 100 allows the end user to combine different data sets during the searching or querying process such that each query builds on the previous query results, as further explained below.

Also, over time, the business intelligence system 100 is configured to learn on multiple levels as more and more end users use the business intelligence system 100. For example, if the business intelligence system 100 does not understand how a keyword is mapped to an existing data structure (e.g., how it is mapped to a data entry or table name of the data sources 118), the business intelligence system 100 provides an interactive object that receives information about the keyword from the end user. In this context, as the business intelligence system 100 is used for querying data, the business intelligence system 100 continues to learn new keyword mappings and get smarter as it receives more and more feedback from the end users. Furthermore, instead of restarting from scratch from every query, the business intelligence system 100 allows the end user to build on each query, thereby building context. For instance, during a session, the end user may begin by querying the data sources 118 for information on all employees of a company. Then, the end user may decide that he/she wants to map the employees onto different continents. Instead of starting from scratch by crafting the query to have two parts (query all employees plus map them onto different continents), the business intelligence system 100 remembers the first query (query all employees), and combines the results of the first query with the subsequent query (map them onto different continents) so that, within the subsequent query, the end user can simply instruct the business intelligence system 100 to map the employees into the different continents and the business intelligence system 100 will know or learn how to combine the data sets.

In addition, the business intelligence system 100 is configured with natural language processing such that the end users can submit queries using natural language input. For example, the business intelligence system 100 can derive meaning on how to retrieve data from the data sources 118 from human or natural language input entered through a user interface layer 102 via a query box 104. As such, the end user does not have to know the technical details of how the data is stored, e.g., the table names, field names of the data sources 118, etc. Rather, the system's semantic layer 110 contains information on keyword mappings, e.g., which words map to the technical data structure (e.g., table names, field names, etc.). As such, over time, by virtue of the end user's feedback regarding unknown keyword mappings, the amount of information contained in the semantic layer 110 increases, thereby creating a self-learning semantic layer 110. Accordingly, the business intelligence system 100 supports the end user by storing all previously entered queries as query history 142, suggesting an alternative if a query does not provide any results and/or prompting the end user to provide additional information about the query to enhance the semantic layer 110.

Also, at some point in the query process, the business intelligence system 100 may predict the next query as a suggestion. For example, the end user may have executed one or two queries, and at this point in the process, the business intelligence system 100 may suggest a query or mapping as a suggestion to consider in the next query step via a prediction box 108, which is based on searches that other people have already done, searches that the same person has done, or certain mappings that other people have done in other contexts in order to not necessarily instruct the end user on what to do, but rather as a reminder of a possibility to obtain more value out of the data of the data sources 118.

The business intelligence system 100 may be any type of system that queries, sorts, analyzes, displays, and/or reports data from the data sources 118. In some examples, the business intelligence system 100 can design and generate reports and/or create interactive dashboards with charts or graphs for visualizing data. In some examples, the business intelligence system 100 is considered a data visualization tool that can visually display the data in a number of different ways such as bar charts, stacked charts, various versions of pie charts, etc., and may alter data structures and correlations without the assistance of IT experts. Further, the business intelligence system 100 can connect data from different data sources 118 while allowing data manipulation, visualization, and sharing. In some examples, the business intelligence system 100 is used in conjunction with an in-memory database platform providing one or more of the data sources 118. In other examples, the business intelligence system 100 is used in conjunction with a standard database platform providing one or more of the data sources 118.

The business intelligence system 100 includes a query engine 120 that receives a query from the query box 104 of the user interface layer 102. The query box 104 may represent a graphical user interface object that allows the user to enter text. The user may enter text through keyboard typing or touch screen. In other examples, the user may speak to the business intelligence system 100, and the business intelligence system 100 may convert the user's speech to text. Also, it is noted that the query box 104 is not necessarily displayed in the form of a square or rectangle, but can encompass any type of shape. The inputted text may be in the form of natural human language. In some examples, the inputted text may include words or phrases commonly used within a business setting—not technical terms associated with the data structures of the data sources 118. However, the user could enter technical terms.

The query may be a request to view, access, and/or manipulate data stored in the data sources 118. Generally, a query is a request for information from the data sources 118, and the query results is generated by the query engine 120 by accessing relevant data from the data sources 118, and manipulating the relevant data to yield requested information. The data sources 118 may include one or more database structures or formats such as column-store data storage, row-store data storage, and/or object-store data storage, but may also encompass any other type of data structure or format. The database structures may be considered complex, where desired data for the query may be retrieved by accessing data using different ways, with different data structures, and in different orders, which typically affects processing times.

The query engine 120 may include a keyword parser 122, a fuzzy logic unit 124, and a query logic unit 126 configured to communicate with the semantic layer 110 to understand and process the query. The keyword parser 122 parses the query to obtain one or more keywords. For example, the keyword parser 122 parses the natural language text of the query to determine one or more keywords. The keyword parser 122 may parse the natural language text of the query according to any type of known parsing techniques. The fuzzy logic unit 124 abbreviates the keywords of the query based on fuzzy logic in order to help map the keywords to existing data structures such as table names, column names, or specific data entries (e.g., dates or locations). In a specific example, the fuzzy logic unit 124 identifies and corrects misspelled keywords.

The query logic unit 126 receives the keywords from the fuzzy logic unit 124, and, for each keyword, determines if a keyword can be mapped to a known keyword mapping using the semantic layer 110. For example, the semantic layer 110 includes keyword mappings 112 that map known keywords to data structures. The data structures may provide how the data is actually stored in the data sources 118. For example, the data structures may identify the table names, column names, row names, and/or data entries of the data sources 118. As such, the keyword mappings 112 provide a link between a keyword (e.g., the full name of the country of where an employee is located—Germany) and the data structure storing this type of information (e.g., the country code—DE).

If the keyword is found within the keyword mappings 112, the query logic unit 126 determines that the keyword can be mapped to a known keyword mapping. Also, if the keyword of the query is a new keyword, the query logic unit 126 may determine whether that new keyword can be mapped to a known data structure. For example, the new keyword may be a keyword that does not have one of the keyword mappings 112. However, the new keyword may be sufficiently similar to one of the keyword mappings 112. As such, the query logic unit 126 may consult with a thesaurus to determine whether or not the new keyword is sufficiently similar to a known keyword of the keyword mappings 112. Stated another way, the query logic unit 126 may use thesaurus information for the new keyword to determine if any other similar words identified by the thesaurus information can be mapped to any known data structure.

If the keyword cannot be mapped to one or more of the keyword mappings 112, the query logic unit 126 may provide an interactive object, via the user interface layer 102, to learn a new keyword mapping for the keyword such that the semantics layer 110 is updated with the new keyword mapping. In particular, the query logic unit 126 may provide the interactive object via the result box 106, and receive feedback from the user regarding the keyword. The result box 106 may represent a graphical user interface object that allows display of the query results or interface objects requesting feedback from the end user. In some examples, the query logic unit 126 determines whether or not the keyword can be mapped to one or more of the keyword mappings 112 based on a confidence level. The confidence level may indicate the system's level of confidence that the keyword can be mapped to one of the keyword mappings 112. In some examples, the confidence level reflects a similarity metric between one of the keywords from the keyword mappings 112 and the keyword being analyzed. If the confidence level is below a first threshold level, the query logic unit 126 may provide the query results via the result box 106 and potentially ask the user if the results match his/her requirements or ask if further refinements are needed. Also, if the confidence level is below a second threshold level (e.g., lower than the first threshold level), the query logic unit 126 does not provide the query results, but rather provides the interactive object to obtain more information about the keyword.

In some examples, the query logic unit 126 may ask the user to explain the keyword for future mappings. In some examples, the query logic unit 126 may suggest one or more existing data structures for the mappings. Then, the query logic unit 126 may be configured to save the new keyword mapping in the keyword mappings 112 of the semantic layer 110. As such, the end user does not have to know the technical details of how the data is stored, e.g., the table names, field names of the data sources 118, etc. Rather, the system's semantic layer 110 contains the keyword mappings 112, e.g., which words map to the technical data structure (e.g., table names, field names, etc.). As such, over time, by virtue of the end user's feedback regarding unknown keyword mappings, the amount of information contained in the semantic layer 110 increases, thereby creating a self-learning semantic layer 110. Stated another way, the semantic layer 110 continues to learn new keyword mappings and becomes more intelligent as it receives more and more feedback from the end users.

The query logic unit 126 continues to process the query based on other information stored in the semantic layer 110 such that the query engine 120 can execute the query on the data sources 118 in the manner specified by the user. The semantic layer 110 may store data relationships 114 of the data stored in the data sources 118. Generally, the data relationships 114 specify the relationships among various pieces of data stored in the data sources 118. In some examples, the data relationships 114 may link data from one data source 118 to data from another data source 118. In some examples, the data relationships 114 may indicate the manner in which data can be combined or manipulated within the context of other data. In a specific example, the data relationships 114 may indicate how a table relates to another table by specifying links between the tables. The semantics layer 110 may also store data source information 116 providing the locations of where the data is stored in the data sources 118.

Similar to the keyword mappings 112, if a relationship of the data with other data is not defined or a location of the data is not defined, the query logic unit 126 may provide an interactive object, via the user interface layer 102, to learn the relationship or location of the data such that the semantics layer 110 is updated with this information. In particular, the query logic unit 126 may provide the interactive object via the result box 106, and receive feedback from the user regarding the relationship or the location. In some examples, the query logic unit 126 may ask the user to explain the data relationship or location keyword for further queries involving this data. In some examples, the query logic unit 126 may suggest relationships or locations. Then, the query logic unit 126 may be configured to save the new data relationships or locations in the data relationships 114 and/or data source information 116 of the semantic layer 110.

Then, the query engine 120 obtains the query results based on the processed query. In some examples, the business intelligence system 100 includes a visualization generator 130 configured to visualize the query results according to a number of different formats such bar charts, stacked charts, various versions of pie charts, etc. In some examples, the visualization generator 130 includes a table generator 132 configured to provide a table view of the query results, and a chart generator 134 configured to provide a chart view of the query results. The chart view and/or the table view may be provided to the user via the result box 106 of the user interface layer 102. It is noted that the result box 106 is not necessarily displayed in the form of a square or rectangle, but can encompass any type of shape.

In some examples, the business intelligence system 100 includes a prediction engine 140 that predicts a subsequent query as a suggestion for the end user, and provides the suggestion via the prediction box 108 of the user interface layer 102. The prediction box 108 may be a graphical user interface object that displays the suggestions provided by the prediction engine 140. It is noted that the prediction box 108 is not necessarily displayed in the form of a square or rectangle, but can encompass any type of shape. The end user may have executed one or two queries, and at this point in the process, the prediction engine 140 may suggest a query or mapping as a suggestion to consider in the next query step via the prediction box 108, which is based on searches that other people have already done, searches that the same person has done, or certain mappings that other people have done in other contexts in order to not necessarily instruct the end user on what to do, but rather as a reminder of a possibility to obtain more value out of the data of the data sources 118.

The prediction engine 140 may check for previous data queries that map the query to predict a subsequent query. For example, the prediction engine 140 may access the query history 142 storing previously executed queries. The previously executed queries include the user's previous executed queries and other user's previous executed queries. Based on the query history 142, the prediction engine 140 may determine whether any previous data queries match the query. If so, the prediction engine 140 may determine one or more subsequent queries as suggestions for the end user. For example, the previous data queries may indicate the next steps taken by the user or other users. As such, the prediction engine 140 may predict one or more next steps for the user based on the previously executed queries of the query history 142, and provide these predictions in the prediction box 108 of the user interface layer 102. As such, the business intelligence system 100 may lower the system's entry-barrier to the end-user by adapting to his/her previous usage, thereby allowing faster results to be provided by the business intelligence system 100.

Furthermore, as indicated above, instead of restarting from scratch from every query, the business intelligence system 100 allows the end user to build on each query, thereby building context. For instance, during a session, the query engine 120 may query the data sources 118 for information on all employees of a company. Then, the end user may decide that he/she wants to map the employees onto different continents. Instead of starting from scratch by crafting the query to have two parts (query all employees plus map them onto different continents), the query engine 120 obtains the first query (query all employees), and combines the results of the first query with the subsequent query (map them onto different continents) so that, within the subsequent query, the end user can simply instruct the query engine 120 to map the employees into the different continents and the query engine 120 can combine both data sets.

For example, the query engine 120 may receive a subsequent query via the query box 104 (e.g., user enters new query) or the prediction box 108 (e.g., user selects a suggested query), and instead of simply processing the subsequent query without reference to any of the previous searches, the query engine 120 builds context by combining the search result of the query with the subsequent query into one combined search set. Then, the keyword parser 122, the fuzzy logic unit 124, and the query logic unit 126 processes the combined search set in the same manner described above, and provide the results back to the user via the result box 106 of the user interface layer 102.

The data of the data sources 118 may include general business data, sales data, accounting data, engineering data, system or process data, scientific data and/or generally any type of data. In some examples, the management of data by the business intelligence system 100 may permit a comprehensive business intelligence solution for assisting with business decisions. In some examples, the business intelligence system 100 may manage a relatively large of unstructured data in a manner that can transform the unstructured or raw data into meaningful and useful information for business analysis purposes. In some examples, the business intelligence system 100 may be configured to perform complex calculation scenarios and/or analytics on the data stored in the data sources 118. As such, the data retrieval and computations performed by the business intelligence system 100 may be relatively complex involving a series of query execution steps, which is compounded by the fact that the data sources 118 may store a relatively large amount of data across a number of business entities. Also, users of the business intelligence system 100 typically require the query results rather quickly. Therefore, the manner in which the business intelligence system 100 queries, retrieves, and manipulates data is relatively important.

In some examples, the data sources 118 is part of a relational database management system (RDBMS). In some examples, the data sources 118 may be part of an in-memory database or in-memory database system. The in-memory database system is a type of database management system that relies on main memory for computer data storage. In contrast, conventional database systems employ a disk storage mechanism. In some examples, the in-memory database includes a combination of main memory and disk storage. Also, the in-memory database system may support real-time analytics and transactional processing including replication and aggregation techniques. Also, within the in-memory database environment, calculation logic is pushed down into the database layer (as opposed to remaining in the application layer) such that the processing time for querying and manipulating the data within the database may be reduced as compared with conventional relational database systems. In some examples, the in-memory database system may be HANA Enterprise 1.0 (any other versions) that is developed by SAP. However, the techniques described herein may be applied to any type of relational database system or other data sources (e.g., the data sources do not necessarily have to be relational).

In some examples, the business intelligence system 100 may operate in conjunction with Structured Query Language (SQL). Generally, SQL refers to a special-purpose programming language designed for managing data held in a relational database management system including an in-memory database. In some examples, SQL may refer to various types of data related languages including, e.g., a data definition language and a data manipulation language, where a scope of SQL may include data insert, query, update and delete, schema creation and modification, and data access control, and SQL may include procedural elements. Further, in some example implementations, SQL may include descriptions related to various language elements, including clauses, expressions, predicates, queries, and statements. For instance, clauses may refer to various constituent components of statements and queries, and in some instances, clauses may be considered optional. Further, expressions may be configured to produce scalar values and/or tables that include columns and/or rows of data. Also, predicates may be configured to specify conditions that may be evaluated to SQL three-valued logic (3VL) (true/false/unknown) and/or Boolean truth values, which may be used to moderate effects of statements and queries, and which may be used to modify program flow.

The query engine 120 may include one or more engines. Generally, the query engine 120 may include any type of engine that queries, retrieves, and/or manipulates data from a relational database according to a query plan. In some examples, the query engine 120 may include a join engine, online analytical processing (OLAP) engine, and/or a calculation engine. The join engine may be used to perform all types of joins. In some examples, the join engine may process the query to obtain an attribute view. For example, the attribute views are used to define joins between tables, and explain to the system 100 a reasonable way for these joins to be undertaken. Also, they can also be used to select a subset of columns and rows from a table.

The OLAP engine may be used for calculation and aggregation. In some examples, the OLAP engine may process the query to obtain an analytical view. The analytical views are typically defined on at least one fact table that contains transactional data. Using analytic views, one can create a selection of measures, add attributes and join attribute views. The calculation engine may be provided on top of the OLAP engine and/or the join engine. The calculation engine may be used for complex calculations that cannot be accomplished by the join engine or the OLAP engine. The calculation engine may process the query to obtain a calculation view. The calculation view may be a graphical or a scripted calculation view that consumes other analytical, attribute, and/or calculation views and tables. The calculation view may include union, join, projection, and aggregation nodes (or any combination thereof), and provides enhanced features such as distinct, count, calculation, and dynamic joins.

The business intelligence system 100 may include at least one processor, and a non-transitory computer-readable medium storing executable code that, when executed by the at least one processor, is configured to implement the components and functionalities of the business intelligence system 100. The non-transitory computer-readable medium may include one or more non-volatile memories, including, by way of example, semiconductor memory devices, e.g., EPROM, EEPROM, and flash memory devices; magnetic disks, e.g., internal hard disks or removable disks, magneto optical disks, and CD ROM and DVD-ROM disks. Also, the non-transitory computer-readable medium may include any devices configured as main memory and/or disk storage. The at least one processor may include any type of general purpose computing circuitry or special purpose logic circuitry, e.g., an FPGA (field programmable gate array) or an ASIC (application specific integrated circuit). Also, the at least one processor may be one or more processors coupled to one or more semi-conductor substrates.

Figure 2:
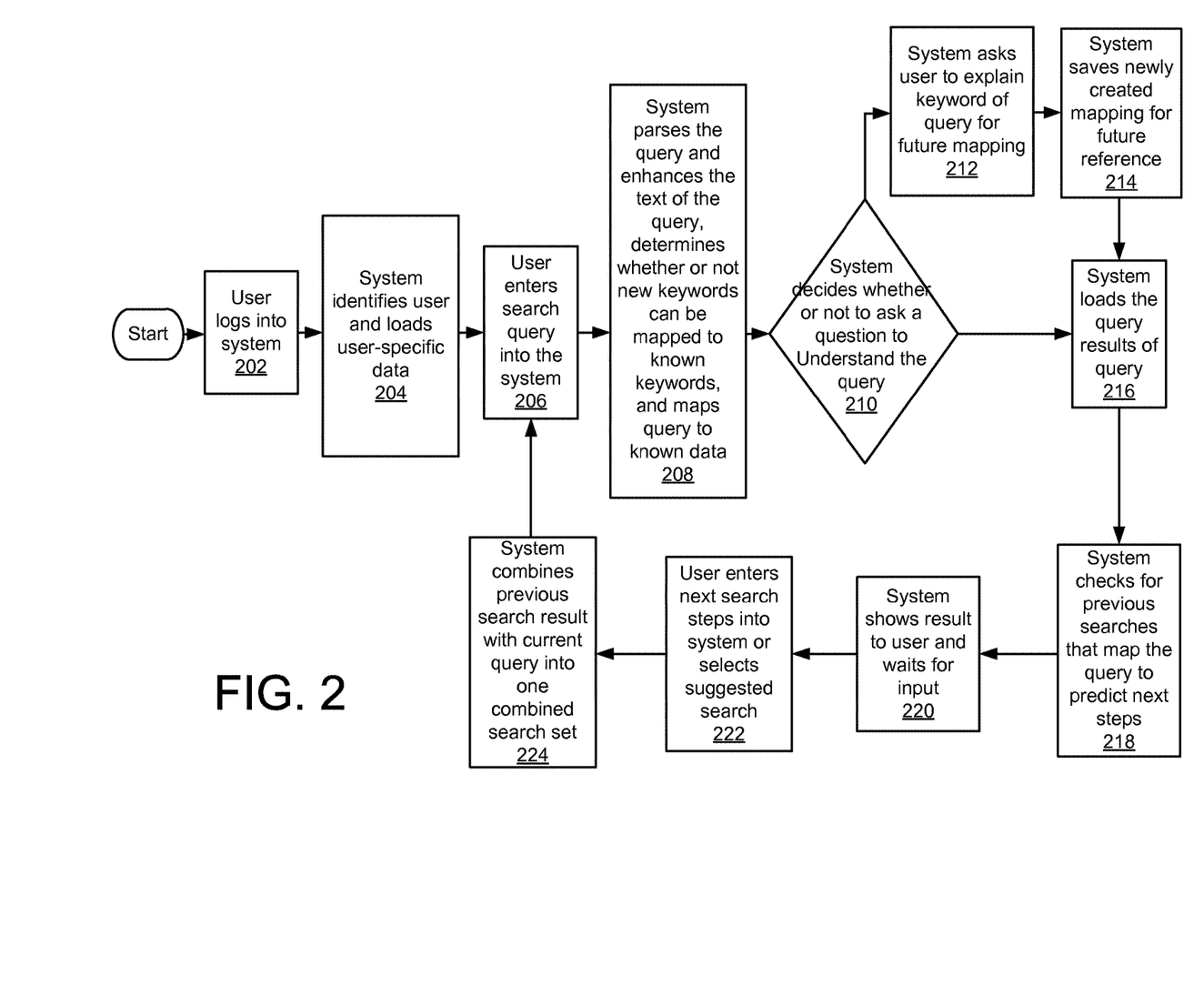
FIG. 2 illustrates a flowchart illustrating example operations of the business intelligence system of FIG. 1.

FIG. 2 illustrates a flowchart illustrating example operations involving the business intelligence system 100. Although FIG. 2 is illustrated as a sequential, ordered listing of operations, it will be appreciated that some or all of the operations may occur in a different order, or in parallel, or iteratively, or may overlap in time.

A user logs into a system (202). For example, the user may provide his/her authentication credentials (e.g., username, password) to the business intelligence system 100.

The system identifies the user and load user-specific data (204). For example, the business intelligence system 100 may identify the user based on the authentication credentials and load information related to the user such as the user's department, role, authorizations, etc.

Then, the user may enter a search query into the system (206). For example, the user interface layer 102 provides a query box 104. The user may enter the query into the query box by typing and/or speaking natural language text.

The system parses and enhances the text of the query, maps new keywords to known keywords, maps keywords to known data structures (208). For example, the query engine 120 may parse the query, enhance the query for potentially mistyped words, determine whether or not new keywords can be mapped to already known keywords, and map query to known data. In particular, the query engine 120 may include a keyword parser 122, a fuzzy logic unit 124, and a query logic unit 126 configured to communicate with the semantic layer 110 to understand and process the query. The keyword parser 122 parses the natural language text of the query to obtain one or more keywords. The fuzzy logic unit 124 abbreviates the keywords of the query based on fuzzy logic in order to help map the keywords to existing data structures by identifying and correcting misspelled keywords. The query logic unit 126 receives the keywords from the fuzzy logic unit 124, and, for each keyword, determines if a keyword can be mapped to a known keyword mapping using the keyword mappings 112 of the semantic layer 110.

The system decides whether or not to ask a question to better understand the query (210). For example, the query logic unit 126 determines whether or not the keyword can be mapped to one or more of the keyword mappings 112 based on a confidence level being above or below one or more threshold levels. The confidence level may indicate the system's level of confidence that the keyword can be mapped to one of the keyword mappings 112. In some examples, the confidence level reflects a similarity metric between one of the keywords from the keyword mappings 112 and the keyword being analyzed. Furthermore, with respect to the data relationships 114 and/or the data source information 116, the query logic unit 126 may determine if the semantic layer 110 includes sufficient information to identify any required relationships and/or the locations of the data. If the confidence below is below a threshold value and/or sufficient information is not provided in the semantic layer 110 to identify the keyword, relationship, or location, the query logic unit 126 may decide to ask the user for further information by providing one or more interactive objects in the user interface layer 102 requesting further information.

If no, the system loads the quest results of the query (216). For example, the query logic unit 126 continues to process the query, and then executes the query on the data sources 118 to obtain the query results. In some examples, the visualization generator 130 visualizes the query results according to one or more of a number of different formats such bar charts, stacked charts, various versions of pie charts, etc. and the views are provided back to the user via the results box 106 of the user interface layer 102.

If yes, the system asks the user to explain a keyword of the query for future mappings (212). For example, if the keyword cannot be mapped to one or more of the keyword mappings 112, the query logic unit 126 may provide an interactive object, via the user interface layer 102, to learn a new data mapping for the keyword such that the semantics layer 110 is updated with the new data mapping. In particular, the query logic unit 126 may provide the interactive object via the result box 106, and receive feedback from the user regarding the keyword.

The system saves the newly created mapping for future reference (214). For example, the query logic unit 126 may be configured to save the new data mapping in the keyword mappings 112 of the semantic layer 110. As such, the end user does not have to know the technical details of how the data is stored, e.g., the table names, field names of the data sources 118, etc. Rather, the system's semantic layer 110 contains the keyword mappings 112, e.g., which words map to the technical data structure (e.g., table names, field names, etc.). As such, over time, by virtue of the end user's feedback regarding unknown keyword mappings, the amount of information contained in the semantic layer 110 increases, thereby creating a self-learning semantic layer 110. Stated another way, the semantic layer 110 continues to learn new keyword mappings and becomes more intelligent as it receives more and more feedback from the end users. After the mapping is stored, the process proceeds to operation 216 which was previously described.

The system checks for previous searches that map the query to predict next steps (218). For example, the prediction engine 140 may check for previous data queries that map the query to predict a subsequent query. For example, the prediction engine 140 may access the query history 142 storing previously executed queries. Based on the query history 142, the prediction engine 140 may determine whether any previous data queries match the query.

The system shows the result to user and waits for input (220). For example, the prediction engine 140 provides the suggestion via the prediction box 108 of the user interface layer 102.

The user enters next search steps into system or selects suggested search (222). For example, the query engine 120 may receive a subsequent query via the query box 104 (e.g., user enters new query) or the prediction box 108 (e.g., user selects a suggested query).

The system combines the previous search results with the current query into one combined search set (224). For example, instead of simply processing the subsequent query without reference to any of the previous searches, the query engine 120 builds context by combining the search result of the query with the subsequent query into one combined search set. Then, the keyword parser 122, the fuzzy logic unit 124, and the query logic unit 126 processes the combined search set in the same manner described above, and provide the results back to the user via the result box 106 of the user interface layer 102.

Figure 3:
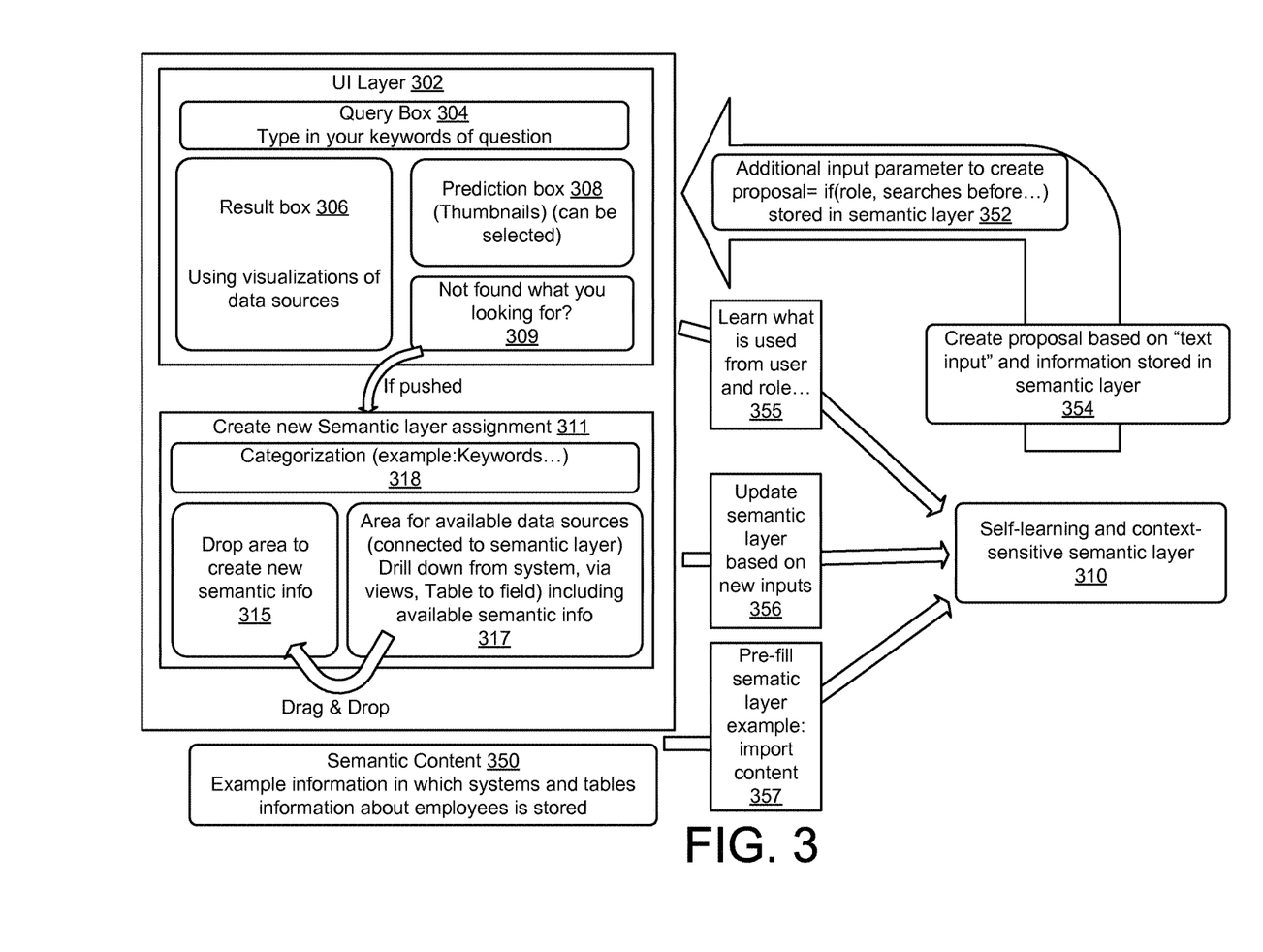
FIG. 3 illustrates a user interface layer defining an interactive dynamic model that enables a self-learning and context-sensitive semantic layer.

FIG. 3 illustrates a user interface layer 302 defining an interactive dynamic model that enables a self-learning and context-sensitive semantic layer 310. The semantics layer 310 includes semantic information about connected data sources, and over time, the semantics layer 310 is populated with new semantic information, thereby building query context and learning new data mappings.

For example, the semantics layer 310 may be populated with new semantic information based on learned information from the user and role (355), new inputs from the user (356), and imported semantic content 350 from external systems (357). For example, with respected to learned information from the user and role (355), the business intelligence system 100 may map based on the role of the user (e.g., HR manager, sales representation, etc.), and what other users have done in a similar situation. Further, the business intelligence system 100 may learn typical patterns based on the role. With respect to the imported semantic content 350 from external systems (357), semantic information may be pre-filled within the semantic layer 310 by importing the semantic content 350 from one or more external systems. For example, the semantic content 350 may identify the data that is stored in various tables and systems.

With respect to the new inputs from the user (356), the semantic layer 310 may be populated with new keyword mappings learned from the user. For example, the user interface layer 302 includes a query box 304, a result box 306, and a prediction box 308. The query box 304 may be an area of the user interface layer 302 that receives natural language input from the user. For example, the user can type in one or more keywords of a question. The result box 306 may be an area of the user interface layer 302 that displays the query results. The prediction box 308 may be an area of the user interface layer 302 that provides one or more suggestions as the next query or query steps to be taken. For example, the prediction engine 140 may display its predictions via the prediction box 308. In some examples, the prediction box 308 may display the query suggestions in the form of selectable thumbnails that can be selected. For instance, selection of a particular thumbnail results in the user's selection of one of the query suggestions.

In some examples, the user interface layer 302 may include a selectable control 309 that prompts a new interactive object 311 for creating a new semantic layer assignment. For example, if the result box 306 depicts the wrong query results (or no search results), the user may select the selectable control 309 by pushing the selectable control 309, which prompts the business intelligence system 100 to populate the user interface layer 302 with the new interactive object 311 for creating a new semantic layer assignment. For example, the interactive object 311 may include a categorization area 318 that receives the keyword to be assigned, and one or more areas 315, 317 that allow the user to browse through the data sources 118 to link the keyword to the relevant part of the data sources 118. In some examples, the area 317 may provide an interactive interface that allows the user to locate the available semantic information. In some examples, the user may drag and drop the identified information to the area 315 to create the new semantic information.

As shown in FIG. 3, the business intelligence system 100 may create a proposal (e.g., query, search term) based on text input received via the user interface layer 302 and the information stored in the self-learning and context-sensitive semantic layer (354). In particular, the business intelligence system 100 may create the proposal based on the role and previous searches of the user and/or other users having the same/similar role (352).

Figure 4:
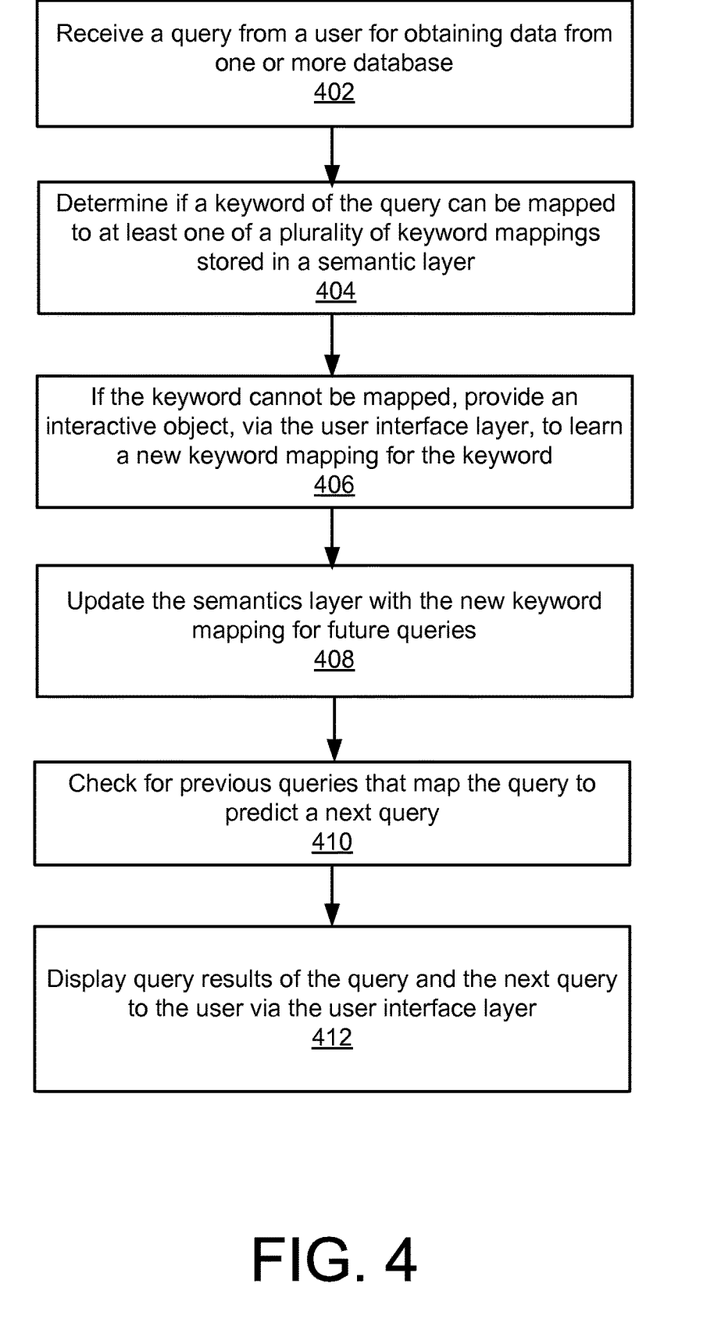
FIG. 4 is a flowchart illustrating example operations of the business intelligence system of FIG. 1.

FIG. 4 is a flowchart illustrating example operations of the business intelligence system 100 of FIG. 1 according to an aspect. Although FIG. 4 is illustrated as a sequential, ordered listing of operations, it will be appreciated that some or all of the operations may occur in a different order, or in parallel, or iteratively, or may overlap in time.

A query is received from a user for obtaining data from one or more databases (402). For example, the query engine 120 may receive the query from the end user via the query box 104 of the user interface layer 102 for obtaining data from one or more data sources 118. The query may include natural language input. In some examples, the query engine 120 include the keyword parser 122, the fuzzy logic unit 124, and the query logic unit 126 configured to communicate with the semantic layer 110 to understand and process the query.

A determination is made whether a keyword of the query can be mapped to at least one of a plurality of keyword mappings stored in a semantic layer (404).

If the keyword cannot be mapped, an interactive object is provided via the user interface layer to learn a new keyword mapping for the keyword (406). For example, if the keyword cannot be mapped to one or more of the keyword mappings 112 of the semantics layer, the query logic unit 126 may provide an interactive object, via the user interface layer 102, to learn a new keyword mapping for the keyword such that the semantics layer 110 is updated with the new keyword mapping.

The semantics layer is updated with the new keyword mapping for future queries (408). For example, the query logic unit 126 may be configured to update the semantic layer 110 with the new keyword mapping for future queries.

Previous queries of the user or other users that map the query are checked to predict a next query (410). For example, the prediction engine 140 may check for previous queries that map the query to predict a subsequent query. The prediction engine 140 may access the query history 142 storing previously executed queries. The previously executed queries include the user's previous executed queries and other user's previous executed queries. Based on the query history 142, the prediction engine 140 may determine whether any previous data queries match the query. If so, the prediction engine 140 may determine one or more subsequent queries as suggestions for the end user. For example, the previous data queries may indicate the next steps taken by the user or other users.

Query results of the query and the next query are displayed to the user via the user interface layer (412). For example, the query engine 120 may be configured to provide the query results via the query box 104 and the next query via the prediction box 108.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for dynamic data modeling that enables a self-learning and context-sensitive semantic layer to query data, the system comprising:
   at least one processor;
   a non-transitory computer-readable medium configured to store executable instructions that when executed by the at least one processor are configured to implement:
   a query engine configured to receive a query from a user via a user interface layer for obtaining data from one or more databases, determine if a keyword of the query can be mapped to at least one of a plurality of keyword mappings stored in a semantic layer, and if the keyword cannot be mapped, provide an interactive object, via the user interface layer, to learn a new keyword mapping for the keyword such that the semantics layer is updated with the new keyword mapping for future queries; and
   a prediction engine configured to check for previous queries of the user or other users that map the query to predict a next query,
   the query engine configured to provide query results of the query and the next query as a suggestion via the user interface layer.

2. The system of claim 1, wherein the query includes natural language input.

3. The system of claim 1, wherein the query engine includes a keyword parser configured to parse the query to obtain one or more keywords.

4. The system of claim 1, wherein the query engine includes a fuzzy logic unit configured to correct a misspelled keyword of the query based on fuzzy logic.

5. The system of claim 1, wherein the query includes a new keyword not found in the semantic layer, the query engine including a query logic unit configured to determine that the new keyword is similar to a known keyword mapping based on thesaurus information.

6. The system of claim 1, wherein, before the query results are provided, the query engine is configured to request feedback from the user regarding a keyword mapping of the query when a confidence level is below a threshold value.

7. The system of claim 1, wherein the query engine is configured to provide a suggested known keyword mapping via the interactive object.

8. The system of claim 1, wherein the query engine is configured to create a new semantic layer assignment based on input received from the interactive object.

9. The system of claim 1, wherein the query engine is configured to receive a subsequent query from the user, and the query engine is configured to combine the query results of the query with the subsequent query to produce a combined search set to be executed on the databases.

10. A computer program product tangibly embodied on a non-transitory computer-readable storage medium and including executable code that, when executed, is configured to cause at least one processor to:
   receive a query from a user for obtaining data from one or more databases;
   determine if a keyword of the query can be mapped to at least one of a plurality of keyword mappings stored in a semantic layer;
   if the keyword cannot be mapped, provide an interactive object, via the user interface layer, to learn a new keyword mapping for the keyword;
   update the semantics layer with the new keyword mapping for future queries;
   check for previous queries of the user or other users that map the query to predict a next query; and
   display query results of the query and the next query to the user via the user interface layer.

11. The computer program product of claim 10, wherein the query includes natural language input.

12. The computer program product of claim 10, wherein the executable code that, when executed, is configured to cause the at least one processor to:
   parse the query to obtain keywords including a new keyword;
   enhance the keywords based on fuzzy logic; and
   map the new keyword to an existing keyword mapping based on thesaurus information.

13. The computer program product of claim 10, wherein the executable code that, when executed, is configured to cause the at least one processor to:
   display the query results when a confidence level is above a threshold value, otherwise request feedback from the user regarding a keyword mapping of the query.

14. The computer program product of claim 10, wherein the executable code that, when executed, is configured to cause the at least one processor to:
   visualize the query results into at least one of a table and a chart.

15. The computer program product of claim 10, wherein the interactive object provides a suggested known keyword mapping.

16. The computer program product of claim 10, wherein the semantic layer also includes data relationship specifying relationships among data in the databases and data source information specifying locations of data in the databases.

17. The computer program product of claim 10, wherein the executable code that, when executed, is configured to cause the at least one processor to:
   combine the query results of the query with a subsequent query to create a combined search set.

18. A method for dynamic data modeling that enables a self-learning and context-sensitive semantic layer to query data, the method being performed by at least one processor, the method comprising:
   receiving a query from a user for obtaining data from data sources, the query including a first keyword and a second keyword;
   determining that the first keyword is a new keyword but is similar to a known keyword mapping stored in a semantic layer;
   determining that the second keyword cannot be mapped to any known keyword mappings stored in the semantic layer;
   providing an interactive object, via a user interface layer, to request a new keyword mapping for the second keyword;
   updating the semantics layer with the new keyword mapping for future queries; and
   obtaining query results corresponding to the query having the first keyword and the second keyword; and
   displaying the query results via the user interface layer.

19. The method of claim 18, wherein the query includes natural language input.

20. The method of claim 18, further comprising:
   receiving a subsequent query;
   combining the query results of the query with the subsequent query to obtain a combined search; and
   executing the combined search on the data sources.

* * * * *